United States Patent [19]
Fugit

[11] 4,047,171
[45] Sept. 6, 1977

[54] TRANSPONDER
[75] Inventor: Brian Blair Fugit, Tempe, Ariz.
[73] Assignee: Motorola, Inc., Schaumburg, Ill.
[21] Appl. No.: 613,374
[22] Filed: Sept. 15, 1975
[51] Int. Cl.² ............................ G01S 9/56; H03H 7/30
[52] U.S. Cl. ................................ 343/6.8 R; 333/30 R
[58] Field of Search .................. 343/6.8 R, 6.8 LC; 333/30 R

[56] References Cited
U.S. PATENT DOCUMENTS

| | | | |
|---|---|---|---|
| 2,671,850 | 3/1954 | Marcov | 343/6.8 R |
| 2,978,699 | 4/1961 | Dodington | 343/6.8 R |
| 3,273,146 | 10/1966 | Hurwitz | 333/30 R |
| 3,513,470 | 5/1970 | Rabow | 343/6.8 R |

Primary Examiner—Maynard R. Wilbur
Assistant Examiner—T. M. Blum
Attorney, Agent, or Firm—Eugene A. Parsons

[57] ABSTRACT

A radar transponder which transmits a frequency coherent coded reply for each interrogation pulse it receives within a broad frequency. The transponder comprises means for receiving an incoming signal pulse; means for converting the incoming pulse into a coded series of delayed pulses that are frequency synchronized with the incoming pulse; and means for transmitting the coded series of delayed pulses.

10 Claims, 3 Drawing Figures

TRANSPONDER

BACKGROUND OF THE INVENTION

1. Field of the Invention

This invention relates to a transponder and, more particularly, to an improved radar transponder for transmitting frequency coherent coded pulses in response to an interrogating pulse.

2. Prior Art

Radar beacon systems are extensively used in navigation for indicating the ranges and positions of hazards along navigation routes. Often, a radar beacon is designed to function as an active reflector and includes a transponder that receives an interrogating pulse, and transmits a reply pulse to an interrogating radar which may be mounted on-board a ship navigating along its route. Present day marine radar beacons utilize a transponder adapted to provide a variable frequency oscillator to slowly sweep the RF frequency band (e.g., 9300 to 9500 megahertz) allocated for navigational purposes. In order to cater to the different frequencies of the various types of the short wave length radars on board the ships within this frequency band, typically the transponder is designed to transmit a coded RF signal when —and only when— the beacon's swept oscillator matches the interrogating radar's transmission frequency. It has been found that with the use of such radar beacon systems, the probability of returning a reply to the interrogating radar on each of its antenna revolutions is rather low, and this has been found to be objectionable especially for ships in approaches to the archipelago. Further, these radar beacon systems suffer in a multi-user environment where, for example, many ships with radars operating at different frequencies within the frequency band are simultaneously interrogating the beacon.

SUMMARY OF THE INVENTION

It is an object of the present invention to provide an improved transponder.

It is another object of the present invention to increase the reliability of a radar transponder by responding to an interrogation signal on a pulse-to-pulse basis anywhere within a wide frequency range.

It is another object of the present invention to provide a transponder that sends out a coded reply to identify itself among radar echoes generated by many transponders or objects in its immediate vicinity.

It is yet another object of the present invention to overcome aforementioned and other shortcomings of the prior art devices.

The foregoing and other objects are achieved, according to the present invention, by providing a transponder that includes means for receiving an incoming pulse; means for converting the incoming pulse into a coded series of pulses that are frequency synchronized with the incoming pulse; and means for transmitting the coded series of pulses.

According to another feature of the present invention, the transponder is provided with RF converting means for down-converting the incoming RF pulse into an IF pulse; surface wave pulse encoding means for encoding the IF pulse into a coded series of delayed wider duration IF pulses that are frequency synchronized with the IF pulse; means for up-converting the coded series of delayed wider duration IF pulses into a series of wider RF pulses, which are frequency synchronized with the incoming RF pulse; and means for amplifying the RF pulses before they are transmitted.

According to yet another feature of the present invention, the transponder is adapted to receive RF pulses of widely varying duration and center frequency falling within an RF bandwidth; to normalize the RF pulse durations to a predetermined value; to down-convert the normalized RF pulses into IF pulses; to encode each IF pulse into the wider duration coded series of IF pulses; to up-convert the IF pulses into RF pulses; and to amplify and transmit the coded RF pulses for each of the incoming RF pulses.

According to yet another feature of the present invention, the surface wave pulse encoder is adapted to stretch a short duration IF pulse into a series of wider output IF pulses over a wide IF bandwidth without introducing signal cancellation due to phasing back in the interrogating radar's receiver IF bandwidth.

The foregoing, as well as other objects and features of the Applicant's transponder, will be more clearly apprehended from the following detailed description of an illustrative embodiment of the present invention in conjunction with the accompanying drawings.

DETAILED DESCRIPTION

Figure 1:
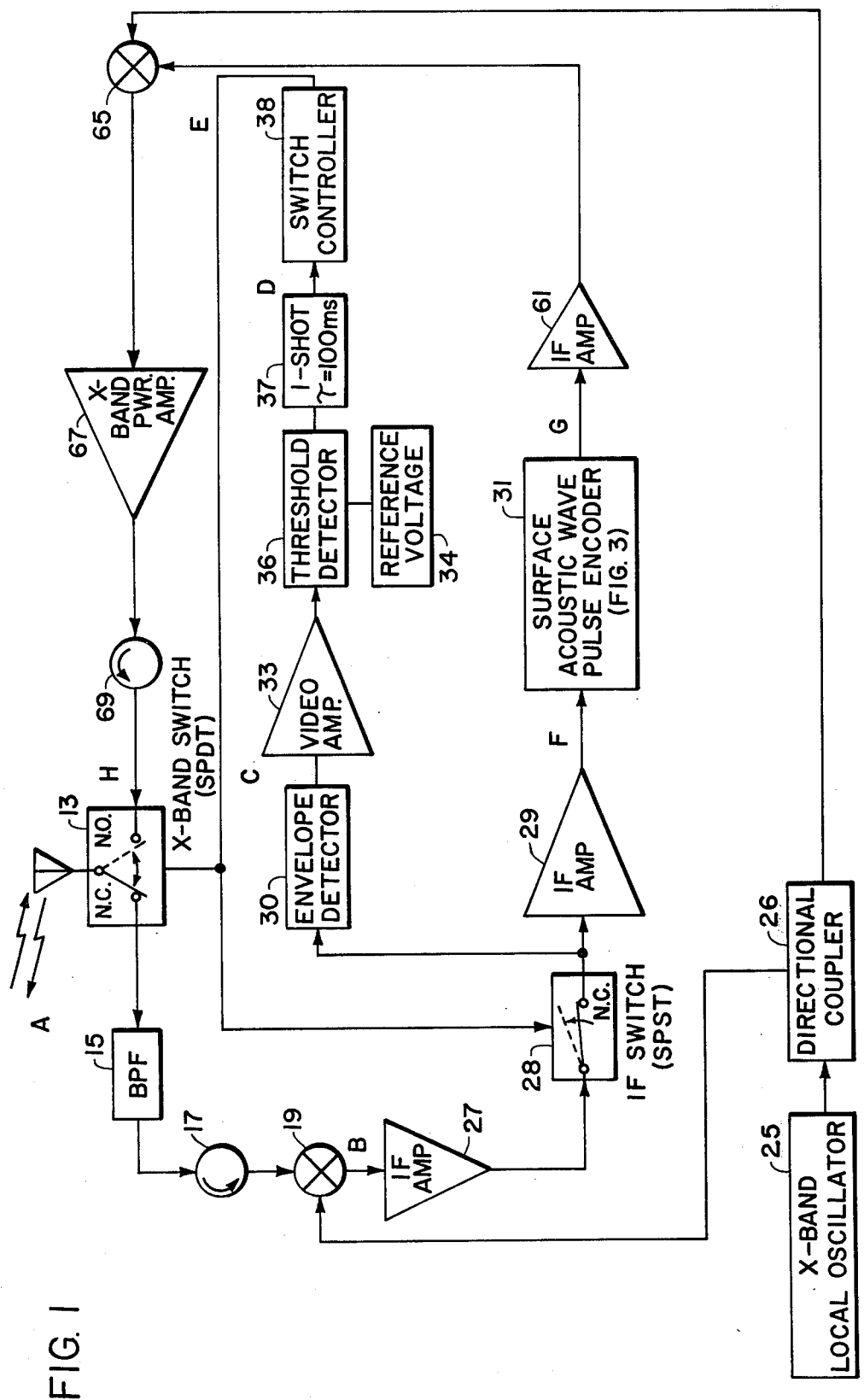
FIG. 1 shows a functional block diagram of an improved transponder of the present invention.
Figure 2:
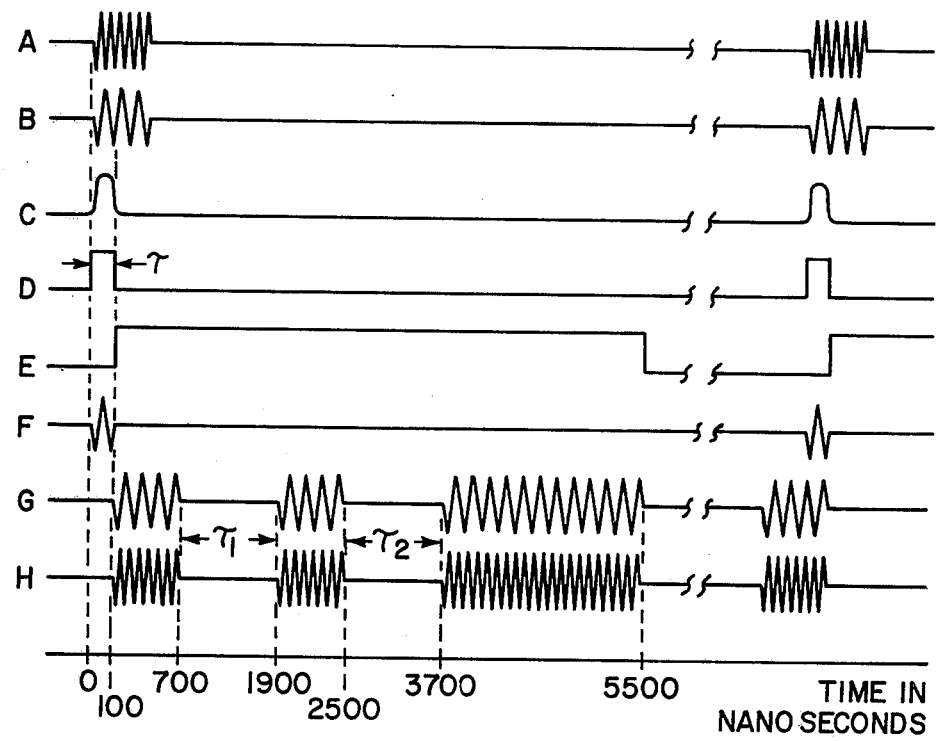
FIG. 2 shows a timing diagram helpful in understanding the operation of the transponder shown in FIG. 1.

The present transponder may be set to operate in a marine radar system operating at X-band, 9300 megahertz through 9500 megahertz. Referring generally to FIGS. 1 and 2, the incoming interrogating signal pulse (FIG. 2A) coming from a radar (not shown) is received by an antenna 11 of the transponder (FIG. 1). The signal pulse is then fed via a suitable switch means 13, to a preselected bandpass filter 15, an isolator of a conventional design 17; and then to a down converter mixer 19. The X-band switch 13 is in the form of a single-pole double-throw (SPDT) switch with the normally closed (N.C.) contact connecting the output of the antenna 11 to the bandpass filter 15.

According to an aspect of the present invention, an X-band oscillator 25 is used to generate a given frequency, for example, 8.9 gigahertz. Oscillator 25 is used as a local oscillator for both the down-conversion and the up-conversion operation of the transponder system, as schematically illustrated in FIG. 1. The incoming radar pulse is down-converted into an IF signal (FIG. 2B) by the mixer using the X-band oscillator output applied thereto via a conventional directional coupler 26. The down-converted pulse is now amplified by an IF amplifier 27 and the amplified IF signal is then applied to a normally closed (N.C.) IF switch 28 in the form of a single-pole single-throw (SPST) switch.

The down-conversion may be in the form of converting the incoming signal pulse of any given frequency in a bandwidth, for example, 200 megahertz at X-band to a 500 megahertz IF frequency with an equivalent bandwidth. The IF output (FIG. 2B) is then amplified, envelope detected by a detector 30 (FIG. 2C), and at the same time the beginning portion of the signal thereof (FIG. 2F) is applied to a surface wave pulse encoder 31 via an IF amplifier 29.

The output of the detector (FIG. 2C) is amplified by a conventional video amplifier 33 and compared against a reference voltage 34 by a threshold detector 36, which establishes the criterion for a valid interrogation signal pulse. The threshold detector is then used to initiate a one-shot multivibrator 37 of a design that is used to generate a precise time delay signal $\tau$ (FIG. 2D) of a given duration (e.g., 100 nanosecond). At the end of the precise time delay $\tau$, a switch control signal (FIG. 2E) is generated by a switch controller 38 of a design that causes the control signal to last for 5.4 microseconds. The switch control signal causes the contacts of switch 13 and switch 28 to move to their normally open state (N.O.) and stay there until the coded reply is completed. In this manner the IF output of the IF amplifier 29 is permitted to enter the surface wave pulse encoder 31 for a precise time period $\tau$ (FIG. 2F); and at the end of the time period $\tau$, the IF signal is truncated so that no further signal or loop noise is permitted to enter the pulse encoder 31 and generate extraneous noise signals. Once the switch control signal (FIG. 2E) has completed its timeout (e.g., 5.4 microseconds), switch 28 and switch 13 revert back to the normally closed state and the system is ready to handle another interrogating signal pulse.

In addition to the function of limiting the duration of the received interrogation pulses to a given time duration $\tau$, the two RF states 13 and 28 also serve the following additional functions. Prior to an interrogation the X-band switch 13 connects the bandpass filter 15 to the antenna 11 through its normally closed contact. This isolates the X-band amplifiers 'in-band' noise from desensitizing the detection circuitry; namely, the detector 30, the video amplifier 33, and the threshold detector 36. Following the detection of a valid interrogation pulse, the switches change their state after time period $\tau$ and provide nearly 100 dB of loop isolation, which prevents RF feed-around during the transmission.

Figure 3:
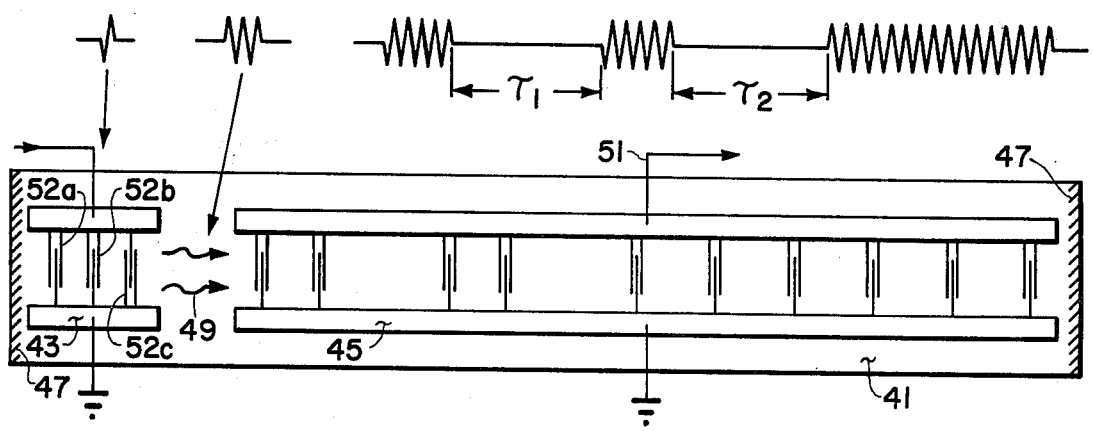
FIG. 3 shows an illustrative example of the surface wave pulse encoder utilized in the transponder system shown in FIG. 1.

The surface wave encoder 31 is advantageously used to respond to the IF amplifier output 29 and encode the truncated IF signal pulse into a particular code format of a predetermined nature to indicate the identity of the transponder. Such encoder may be in the form of a piezoelectric delay line of a particular design, as schematically illustrated in FIG. 3; it includes a piezoelectric substrate 41, input and output transducers 43 and 45 mounted on the substrate and an acoustic absorbing compound 47 across each end of the substrate. The input transducer may be configured in the form of a conventional three-bit Barker coded transducer and an output transducer configured to provide a coded pulse output having a predetermined pulse width and delay between the pulses (as illustrated in FIG. 2G). The coded output is then applied to an IF amplifier 61. The amplified output is up-converted back to the received RF center frequency by a mixer 65 with the output of the X-band oscillator 25 via the directional coupler 26.

By utilizing the same X-band oscillator for both the up- and down-conversion operation, the frequency of the received interrogating signal is preserved. The power level of the coded output signal pulses are amplified before the retransmission by an X-band power amplifier 67 of a conventional GUNN diode design. It is well established that GUNN amplifiers are capable of generating power levels of 100–200 milliwatts at X-band. A reply code output from the power amplifier is radiated back to the interrogating radar from antenna 11 via an isolator 69 and switch 13 (FIG. 2H). Switch 13 is held in the normally open position as mentioned earlier by the switch control signal (FIG. 2E) until the coded reply is complete.

Referring to FIG. 3, more specifically, the surface wave pulse encoder is designed so that the input IF signal of a given duration, for example 100 nanoseconds, is applied to a three-bit Barker coded input transducer 43 and is converted into an acoustic pulse of another duration, for example, 300 nanoseconds duration 49. The 300 nanosecond acoustic pulse is then propagated down the device and converted into a series of delayed coded IF pulses 51 by the output transducer 45 with pulse durations of 600 nanoseconds and 1800 nanoseconds. In effect the encoding process involves the steps of adding the input pulse of 100 nanoseconds of a given IF frequency a given number of times for example, three times, to form 300 nanoseconds of acoustic wave of the same IF frequency by the input transducer. The acoustic wave is then converted by the output transducer into the output wave of three pulses of 600, 600 and 1800 nanoseconds spaced apart by 1200 nanoseconds by the output transducer.

Both the input and output surface wave transducers are non-recursive signalling structures. The time delays $\tau 1$ and $\tau 2$, between the pulses are formed by appropriate spacings of the interdigital transducers 52 in a conventional manner. The encoder may be designed to form a given pulse code; for example, a Morse Code letter U is formed (FIG. 2G) by configuring the geometry of the delay line which controls the spacings between the interdigital transducer pairs 52.

Thus, the inherent ability of the surface wave encoder to store temporarily and manipulate the IF energy propagating along its surface is used advantageously to generate a series of longer IF pulses from a single short-duration input IF pulse; wherein the wider output pulses are formed by sequential increments of the input pulse.

As indicated above the input transducer was used as a key element to lengthen the encoded IF pulse duration. In the course of developing the encoder, however, the input transducers of different phase codes were tried; but it was found that not all of them were satisfactory. This was apparently due to the fact that some code combinations introduced phase shifts or jumps between the adjacent 100 nanosecond IF acoustic waves and this caused envelope cancellation when received by the radar receiver of narrow bandwidth. For example, when a '111' code combination was selected for the input transducer, it tended to cause phase shifts between the adjacent 100 nanosecond signal increments at certain discrete frequencies within the band of 120° phase shift. This phase shift tended to cause a signal cancellation back in the radar, particularly when the narrow band radar receiver was used.

In practical applications the center frequency of the interrogating radar receiver is not generally known and they vary from unit to unit. Moreover, the receivers of the various radars with which the present transponder must operate, have not only narrow bandwidth receiver but also have different frequency bandwidths, and different center frequencies. Consequently, in practice, the transponder must be agile to receive the interrogating signal pulses which may vary from one frequency to another frequency within a wide band and must generate an output to the receiver of the radar which is frequency coherent with the particular interrogating pulse that it receives.

According to a feature of the present invention, the input transducer of the encoder is designed to receive input IF signal of different frequencies that range within a wide bandwidth and generate an IF acoustic wave and lengthen its duration as stated before without causing the phase shifts between the 100 nanosecond pulses that avoids the envelope cancellation at the narrow band radar receiver. The envelope cancellation in the narrow bandwidth radar receiver is avoided by the use of the '110' Barker encoded transducer wherein the third interdigital finger pair 52C is inverted in phase, that is, shifted 180° relative to the first two interdigital finger pairs 52A and 52B. It was found that the use of the '110' Barker code prevented any unique phase jumps between successive 100 nanosecond increments of the input pulse from causing the envelope cancellation back in the narrow bandwidth radar receiver. In effect, the coding keeps the bulk of the reply energy from the transducer within the IF bandwidth of the radar receiver with as little as possible energy shifted out of sidebands. In short the input transducer in accordance with an aspect of the present invention, was phase coded to ensure that the pulse lengthening operation by the input transducer of the incoming IF signals, whose frequency may vary over a wide, bandwidth did not cause envelope cancellation.

The care with which the input transducer had to be designed and coded to avoid envelope cancellation at the radar receiver was found to be not as critical where the radar receiver had a wide IF bandwidth, for example, 10 megahertz. It is believed that the phase shifts or jumps between the 100 nanosecond waves did not significantly affect the detection ability of the receiver that has such a wide bandwidth capability. Apparently this is the case since the sideband energy is still within the radar bandwidth.

However the present transponder is designed not only to operate with radars with wide bandwidth receivers, but also with the narrow bandwidth receivers which are extensively used in actual applications. Accordingly, the transponder had to be designed to accommodate narrow bandwidth radar receivers, such as 1 megahertz IF bandwidth, where loss of the sideband energy can cause the reply from the transponder to be missed by the receiver. In accordance with an advantageous feature of the present invention, the envelope cancellation caused by the phase shift between the 100 nanosecond IF acoustic waves is avoided by changing the polarity of interdigital finger pairs of the input transducer so that the adjacent 100 nanosecond signal increments do not destructively interfere with each other. This is accomplished by utilizing the Barker code encoding arrangement as illustrated in FIG. 3. It is to be understood that the Barker Code used for the input transducer as described hereinabove is illustrative of certain codes which avoid envelope cancellation at the receiver of radar with narrow bandwidth.

In summary, the surface wave pulse encoder 31 generates a coded series of longer pulses from a single short-duration input pulse without introducing signal cancellation in a narrowband interrogating radar receiver operating at any center frequency within a broad frequency band (i.e. 9300 to 9500 MHz).

In short, herein above an illustrative embodiment of a frequency agile transponder that includes conventional down-converting and up-converting means which provide the converting function using the same local oscillator for maintaining the frequency coherency between the input and the output and an acoustic surface wave device designed to serve the function of converting an input pulse of any particular given frequency and duration within a broad band into an output of encoded pulses of the same frequency, but of different code format.

The frequency agile radar transponder described herein is found to provide the following significant improvements over the existing transponders:

1. It responds instantaneously to an interrogating radar pulse anywhere in the entire marine radar band (9300 through 9500 megahertz), and paints the coded reply on the radar's PPI display during each antenna revolution.
2. The transmitted RF reply pulses are frequency synchronized with the associated RF interrogation pulse on a pulse-to-pulse basis, allowing the transponder to work satisfactorily in a multi-user environment.
3. With the present transponder, the retransmit signal (that is the delayed coded series of output pulses) increases its amplitude level with decreasing distance between the radar and the transponder. By this it is meant that as the radar's received signal gets stronger at short distances, the transponder's output signal level increases correspondingly. This offsets the increasing clutter power observed by the radar at short ranges.
4. It encodes the received interrogating pulse directly in the IF domain using the surface wave device, and thus requiring no modulation circuits.
5. It utilizes a common oscillator for the down-conversion and up-conversion mixing operations. The pulse encoder is also used advantageously as a storage and as a code generating means while at the same time maintaining frequency coherency for the transponder.

Various modifications and changes may be made by those of the ordinary skill without departing from the spirit and the scope of the present invention described above.

What is claimed:

1. A frequency agile transponder, comprising:
    means for receiving a relatively narrow interrogating signal pulse of a particular frequency falling within a given frequency band, and
    means responsive to said interrogating signal pulse for transmitting a coded series of reply pulses that are frequency synchronized with said interrogating signal pulse, said responsive means including frequency memory means for receiving a frequency coherent pulse indicative of the interrogating signal pulse and converting the frequency coherent pulse to a coded series of frequency coherent pulses, said frequency memory means being phase coded to prevent envelope cancellation in the series of pulses.

2. The transponder according to claim 1, wherein said transponder is responsive to incoming signal pulses in an RF frequency range and wherein said responsive means includes means for down-converting the incoming RF pulse into an IF pulse and supplying the IF pulses to the frequency memory means for pulse encoding the IF pulse into a series of delayed wider duration IF pulses that are frequency synchronized with the IF pulse, and means for up-converting the series of delayed wider duration IF pulses into a corresponding series of delayed wider RF pulses which are frequency synchronized with the incoming RF pulse.

3. The transponder according to claim 1, wherein said frequency memory means is an acoustic surface wave device.

4. The transponder according to claim 3, wherein said acoustic surface wave device includes a Barker coded input transducer for generating an acoustic pulse without signal cancellation at discrete frequencies within the IF band of an interrogating radar receiver and an output transducer for encoding said acoustic pulse into the series of coded and delayed IF pulses.

5. The transponder according to claim 4, wherein said Barker coded input transducer includes transducer pairs designed to lengthen the received IF pulse and convert the stretched IF pulse into an acoustic pulse.

6. A frequency agile transponder comprising:
means for receiving a relatively narrow segment of an interrogating signal pulse, the pulse having a frequency falling within a given frequency band;
frequency memory means responsive to said segment for transmitting a series of variously delayed segments substantially similar to the received segment; and
means coupled to said frequency memory means for augmenting the phase shift produced by the time delay of any transmitted segment by a phase angle substantially independent of frequency, said augmenting phase angle being chosen for each segment to enhance the peak response of a receiver responsive to signals in a band including the segment frequency, which band is narrow relative to the given frequency band and to the inverse of the segment duration.

7. The transponder according to claim 6 wherein the transmitted series of variously delayed and phase shifted segments is further modulated to convey information to the narrow band receiver.

8. The transponder according to claim 6 wherein the series of variously delayed segments is three segments.

9. The transponder according to claim 8 wherein the means for augmenting the phase shift of the three delayed segments provides phase angles of 0°, 0° and 180°, respectively.

10. The transponder according to claim 8 wherein the means for augmenting the phase shift of the three delayed segments provides phase angles of 0°, 180° and 180°, respectively.

* * * * *